(12) United States Patent
Kuchler et al.

(10) Patent No.: US 10,752,061 B2
(45) Date of Patent: Aug. 25, 2020

(54) METHOD AND DEVICE FOR TRANSMITTING DATA FROM A WHEEL UNIT ARRANGED ON A WHEEL OF A VEHICLE TO A CENTRAL UNIT OF THE VEHICLE

(71) Applicant: Continental Automotive GmbH, Hannover (DE)

(72) Inventors: Gregor Kuchler, Hannover (DE); Frank Fischer, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 16/065,664

(22) PCT Filed: Dec. 20, 2016

(86) PCT No.: PCT/EP2016/081972
§ 371 (c)(1),
(2) Date: Jun. 22, 2018

(87) PCT Pub. No.: WO2017/108823
PCT Pub. Date: Jun. 29, 2017

(65) Prior Publication Data
US 2019/0001766 A1    Jan. 3, 2019

(30) Foreign Application Priority Data
Dec. 23, 2015   (DE) .................. 10 2015 226 616

(51) Int. Cl.
*B60C 23/04* (2006.01)
*B60R 16/023* (2006.01)

(52) U.S. Cl.
CPC ...... *B60C 23/0457* (2013.01); *B60C 23/0454* (2013.01); *B60C 23/0462* (2013.01); *B60C 23/0464* (2013.01); *B60R 16/0231* (2013.01)

(58) Field of Classification Search
CPC .......... B60C 23/0231; B60C 23/0408; B60C 23/0416; B60C 23/0454; B60C 23/0457;
(Continued)

(56) References Cited

U.S. PATENT DOCUMENTS

| 6,469,989 B1 | 10/2002 | Ernst |
| 2004/0046651 A1 | 3/2004 | Norimatsu |

(Continued)

FOREIGN PATENT DOCUMENTS

| CN | 102285306 A | 12/2011 |
| CN | 103029537 A | 4/2013 |

(Continued)

OTHER PUBLICATIONS

Office Action dated Oct. 25, 2016 from corresponding German Patent Application No. 10 2015 226 616.8.
(Continued)

*Primary Examiner* — Orlando Bousono

(57) ABSTRACT

A method for transmitting data from a wheel unit arranged on a wheel of a vehicle to a central unit of the vehicle, involving: sending the data in the form of temporally spaced data transmissions from the wheel unit to the central unit, transmission times of the data transmissions being stipulated by the wheel unit according to a transmission algorithm; and receiving the data transmissions sent by the wheel unit via the central unit is disclosed. The method may further comprise: evaluating reception times at which each of the data transmissions are received by the central unit, according to an evaluation algorithm making allowance for the transmission algorithm; and rating the data transmissions on the basis of a result of the evaluation of the reception times. Further, a corresponding apparatus for data transmission in a vehicle is disclosed.

20 Claims, 4 Drawing Sheets

(58) Field of Classification Search
CPC ............ B60C 23/0462; B60C 23/0464; B60C 23/0488; H04B 1/707; H04L 5/023
See application file for complete search history.

(56) References Cited

U.S. PATENT DOCUMENTS

| | | |
|---|---|---|
| 2005/0104715 A1 | 5/2005 | Farrell |
| 2005/0109094 A1 | 5/2005 | Umegaki et al. |
| 2009/0009311 A1 | 1/2009 | Escarpit |
| 2013/0076500 A1 | 3/2013 | Yu et al. |

FOREIGN PATENT DOCUMENTS

| | | |
|---|---|---|
| DE | 19737945 B4 | 3/1999 |
| DE | 1873945 B4 | 5/2004 |
| DE | 102005005560 A1 | 8/2006 |
| DE | 112013000606 T5 | 10/2014 |
| EP | 1336512 A1 | 8/2003 |
| JP | 2006021717 A | 1/2006 |
| JP | 2011168099 A | 9/2011 |
| WO | 2006099953 A1 | 9/2006 |

OTHER PUBLICATIONS

International Search Report and Written Opinion dated Mar. 23, 2017 from corresponding International Patent Application No. PCT/EP2016/081972.

METHOD AND DEVICE FOR TRANSMITTING DATA FROM A WHEEL UNIT ARRANGED ON A WHEEL OF A VEHICLE TO A CENTRAL UNIT OF THE VEHICLE

The present invention relates to a method and an apparatus for transmitting data from a wheel unit, arranged on a wheel of a vehicle, to a central unit of the vehicle.

Methods and apparatuses for data transmission in a vehicle are known for tire pressure control systems, for example from DE 10 2005 005 560 B4 and DE 197 37 945 B4.

Such tire pressure control systems can advantageously be used to monitor one or more tire pressures on a vehicle equipped with wheels having tires. It is thus possible, e.g. in the event of an excessive pressure loss, for an appropriate warning to be output to a driver of the vehicle and/or for an appropriate piece of information to be provided to onboard electronics of the vehicle.

In a tire pressure control system, the data transmitted from an electronic wheel unit installed on a wheel of the vehicle to a central unit of the vehicle typically contain at least a piece of information about the tire pressure of the relevant wheel.

Moreover, the data can contain an identification code for identifying the relevant wheel unit, in order, in particular in the case of multiple wheel units each installed on one of multiple wheels, to be able to assign the respectively transmitted data to the correct wheel unit, i.e. the one sending these data.

Further, it is already known practice in tire pressure control systems for a piece of information about at least one other wheel operating parameter, such as e.g. a tire temperature, a wheel speed or a piece of tire contact-area-length information, i.e. a piece of information about a length of the tire contact surface, also to be transmitted with the data in addition to a piece of information about the tire pressure.

DE 197 37 945 B4 discloses the practice of transmitting the data from a wheel unit in the form of temporally spaced data transmissions to the central unit of the vehicle, intervals of time between the data transmissions being stipulated in a fashion varying according to a random algorithm, and a piece of information about the interval of time at which the next data transmission of a wheel unit can be expected being recorded in each data transmission, so that an evaluation of the latter information in the central unit of the vehicle allows reception time windows to be stipulated in which data transmissions can be received. Since the central unit is switched to a data reception mode only when a data transmission from a wheel unit can be expected, the energy resources of the central unit and of the individual wheel units can be saved.

It is an object of the present invention to allow a method and an apparatus for transmitting data from a wheel unit, arranged on a wheel of a vehicle, to a central unit of the vehicle to have both a high level of performance guaranteed for the data transmission connection and a certain level of protection provided against manipulations of the data transmission. Further, it is an object of the present invention to specify a corresponding computer program product and a corresponding computer-readable medium.

According to the invention, these objects are achieved by a method as claimed in claim 1, an apparatus as claimed in claim 10, a computer program product as claimed in claim 13 and a computer-readable medium as claimed in claim 14.

Advantageous developments of the invention are the subject of the dependent claims and of the description that follows.

A first aspect of the invention relates to a method for transmitting data from a wheel unit, arranged on a wheel of a vehicle, to a central unit of the vehicle, involving:
sending the data in the form of temporally spaced data transmissions from the wheel unit to the central unit, transmission times of the data transmissions being stipulated by the wheel unit according to a transmission algorithm,
receiving the data transmissions sent by the wheel unit by means of the central unit,
evaluating reception times at which each of the data transmissions are received by the central unit, according to an evaluation algorithm making allowance for the transmission algorithm, and
rating the data transmissions on the basis of a result of the evaluation of the reception times.

The basic concept of the invention is to actually receive data transmissions, in particular even e.g. falsified data transmissions, and preferably even to receive them at any time, but then to rate these received data transmissions individually, for example to consider each of them as "valid" or "invalid", on the basis of an evaluation of the reception times, so that, by way of example, the central unit provides an additional piece of information (rating result) that can advantageously be used in particular e.g. for eliminating invalid or potentially falsified data transmissions (before further use of the data content). This advantageously allows manipulations by an unauthorized party, for example what is known as a hacker, to be hampered by virtue of the data transmission not being able to be manipulated simply by virtue of a data transmission being intercepted and evaluated and a data transmission with falsified content (e.g. indicating a very low tire pressure) being transmitted at an arbitrary time and subsequently received by the central unit.

In contrast to the method according to the aforementioned aspect of the invention, the central unit according to DE 197 37 945 B4 is only intermittently in a data reception mode, which means that data transmissions transmitted at an inappropriate time are not received in the first place. However, this also means that the actually desired level of performance of the data transmission connection can be adversely affected, in particular because no data transmissions at all can be transmitted in those periods in which the central unit is not in the data reception mode.

The method according to the aforementioned aspect of the invention can be used to advantageously avoid such an adverse effect on the level of performance of the data transmission connection, a certain level of protection against manipulations of the data transmission being provided at the same time.

An essential aspect of the implementation in this case is that an evaluation algorithm used for evaluating the reception times makes allowance for a transmission algorithm used by the relevant wheel unit to stipulate the transmission times. There are many and diverse possibilities for this allowance being made. An essential aspect in this case is an evaluation of whether a reception time for the relevant data transmission, possibly also making allowance for the data content of this and/or at least one past received data transmission, is compatible with the transmission algorithm. Exemplary embodiments of this allowance being made will be described later on.

The invention advantageously allows, as already explained, a high level of performance to be attained for the data transmission connection, in particular if in the course of the method, when considered over time, data transmissions are received, evaluated and rated for a majority of the time. By way of example, there may be provision for data transmissions to be able to be received and processed in this manner at any time during the method or during operation of the apparatus.

Even if data transmissions can be received and processed at any time, the invention can advantageously be used to attain essentially the same security against manipulation, i.e. a reduction in the risk of acceptance of data transmissions transmitted illegally by a third party, as in the case of DE 197 37 945 B4. The reason is that data transmissions received at an inappropriate time can be rated accordingly.

With regard to the invention being able to be used for safety-critical applications during the operation of vehicles, such as for tire pressure control, for example, a particular advantage of the invention is in particular that important data can also immediately be transmitted to the central unit in any kind of emergency situation. For this, it is expedient if the transmission algorithm makes allowance for such an emergency situation (e.g. sudden excessive loss of tire pressure) and in this situation permits sending even at a time for which there is no provision in a normal operating situation (in particular immediate sending).

In one embodiment, there is provision for the wheel unit to be switchable between multiple modes of operation and for the transmission algorithm to involve an interval of time between successive instances of the data transmissions being stipulated on the basis of a current mode of operation of the wheel unit.

In particular, the wheel unit may be switchable e.g. at least between (at least) an idle mode and (at least) a normal mode of operation, wherein in the idle mode the transmission algorithm may provide for relatively long intervals of time between the data transmissions (e.g. in the order of magnitude of approximately one hour) or even total dispensation with data transmissions, whereas in the normal mode of operation the transmission algorithm may provide for stipulation of contrastingly shorter intervals of time (e.g. in the order of magnitude of approximately one minute, or less).

The switch between the two cited modes of operation can be effected e.g. based on the result of detection of a rotary motion state of the relevant wheel (on which the wheel unit is arranged), performed by the relevant wheel unit regularly at short intervals of time or continuously, such that if the wheel is at a standstill, or e.g. the wheel is at a standstill lasting for at least a predetermined period, the wheel unit is switched to an idle mode, whereas the wheel unit is switched to a normal mode of operation on detection of a wheel rotation or e.g. a wheel rotation lasting for a predetermined period.

In one development of this embodiment, the interval of time between successive instances of the data transmissions is not only stipulated by the transmission algorithm on the basis of the current mode of operation but is also stipulated definitively by making allowance for at least one further wheel operating parameter ascertained by means of the wheel unit, such as e.g. a rotary angle position of the wheel. It is thus possible e.g. for an embodiment to be realized in which data transmissions are each sent e.g. at a predetermined rotary angle position and/or at a rotary angle position that varies from data transmission to data transmission. The term "wheel operating parameter" is intended here to generally cover any physical variable capturable at the relevant wheel and variable in a manner consistent with operation of the wheel.

A preference for this embodiment, however, is that the current mode of operation, at least if it is the or an idle mode or the or a normal mode of operation, at least jointly determines the interval of time between successive data transmissions.

This joint determination (stipulation) of the interval of time may in particular be provided e.g. such that each interval of time (possibly even also making allowance for a further determination parameter besides the mode of operation), for a normal mode of operation, is in a range that does not overlap a range containing all of the intervals of time possible for an idle mode.

By way of example, the present mode of operation can be used for a basic setting of the relevant interval of time, e.g. to a value of between 10 minutes and four hours in an idle mode or a value of between one second and 100 seconds in a normal mode of operation, whereas a further additional setting is made based on at least one wheel operating parameter (or a variable derived therefrom). This additional setting may be implemented e.g. as part of the stipulation of the interval of time by an addition or subtraction of an additional time, or else can be stipulated, e.g. in the form of a delay for the data transmission up to a time at which the wheel has reached a rotary angle position predetermined by the transmission algorithm, only after the period prescribed by the basic setting has elapsed.

In one embodiment, in addition to the (at least one) normal mode of operation, (at least) an alarm mode of operation is provided so as thereby to advantageously be able to send data transmissions as promptly as possible in the event of urgent need, such as e.g. in an emergency situation (e.g. detection of a rapid and excessive drop in tire pressure), even outside a time interval scheme provided for the idle mode and the normal mode of operation.

In one embodiment, there is provision for each of the data transmissions to contain a piece of information about the current mode of operation of the wheel unit and/or a piece of information about the interval of time between successive instances of the data transmissions.

The information about the current mode of operation of the wheel unit can be extracted by the central unit from the respectively received data transmissions, for example, and then advantageously used for evaluating the reception times.

A pertinent example: if the central unit knows that the wheel unit is in an idle mode or a normal mode of operation, whether on the basis of an evaluation of the reception times of previously received data transmissions and/or on the basis of the information that the data transmission contains about the current mode of operation, a data transmission subsequently received at an appropriate time (i.e. a time compatible with the transmission algorithm) can be rated as valid. By contrast, data transmissions received at an inappropriate time in a manner consistent with the most recently discovered mode of operation can e.g. be evaluated to ascertain whether a change of mode of operation has perhaps taken place that makes the relevant reception time seem plausible (compatible with the transmission algorithm) again. The operating mode information contained in the data transmission can be used for the latter evaluation.

Detection of an "alarm mode of operation" piece of information contained in a data transmission can result, as part of the evaluation and rating of this data transmission, e.g. in the data transmission being rated as valid if the reception time is within a period that the transmission algorithm approves for sending in the alarm mode of operation. In the extreme case, the transmission algorithm can provide for data transmissions to be able to be effected at any time in the alarm mode of operation.

The use that the central unit makes, for example, of knowledge of the current mode of operation in conjunction with the knowledge of the transmission times, or intervals of time between successive data transmissions, permissible in this mode of operation is an example of allowance being made for the transmission algorithm of the wheel unit by the evaluation algorithm of the central unit.

The same also applies to use that the central unit makes, for example, of a piece of information about the next transmission time or interval of time for the next data transmission that is taken from the content of a data transmission itself.

To make it difficult, when there is an alarm mode of operation e.g. with the possibility, which the transmission algorithm provides for this purpose, of sending at any time, for a hacker to manipulate by sending a falsified data transmission with an indication of this mode of operation, there may be provision for the central unit, after such a data transmission is received for the first time, not to immediately effect appropriate use or initiation of applicable measures, but rather to await at least single confirmation, as defined according to the transmission algorithm, of the data transmission by (at least) a subsequent further data transmission.

With regard to implementation of the feature according to which the evaluation algorithm of the central unit, for example, makes allowance for the transmission algorithm of the wheel unit, there is provision in one development for the evaluating of the reception times to comprise stipulating reception time windows for the reception times and comparing the actual reception times with the reception time windows.

Since the evaluation algorithm has a certain level of knowledge about the transmission algorithm and the operation thereof, it is possible on this basis for the reception time windows to be stipulated as periods in which data transmissions to be rated as valid can be expected. In particular, e.g. immediately after reception or a short time after reception of a data transmission that is valid for the wheel unit, a reception window can be closed, so that data transmissions received in this situation fundamentally need to be rated as invalid (unless they are e.g a data transmission that is sent in the alarm mode of operation and for which sending in this period is approved).

Moreover, there may be provision for the central unit, for example, to open a reception time window before a time at which, after reception of a valid data transmission from the relevant wheel unit, the next data transmission from this wheel unit can be expected. This expectation may, as already explained above, be based e.g. on knowledge of the current mode of operation and/or of a currently provided transmission time interval of the wheel unit. A data transmission arriving after this opening of the reception window, this opening preferably being effected shortly before said expected time, can then fundamentally be rated as valid.

The term "shortly" is intended in this context to cover in particular a period that is less than 20%, in particular less than 10%, of the interval of time that can be expected for a next data transmission after reception of a data transmission.

In one embodiment, there is provision for the data transmissions of the wheel unit to be received using a signal reception device of the central unit, which is further configured to receive data transmissions of at least one further transmission device, which is different than the wheel unit.

Apart from the case in which the signal reception device (e.g. radio reception device) is used to receive data transmissions of further wheel units arranged on further wheels of the same vehicle, use of the signal reception device to receive data transmissions of an electronic key of a locking system (e.g. of a central locking system) of the vehicle and/or other data transmission sources that can be used operationally during use of the vehicle (e.g. for communication with mobile terminals carried by the driver of the vehicle, etc.) is in particular also conceivable here.

In one embodiment, there is provision for the evaluating of the reception times to comprise adapting rates of a (first) timer used in the wheel unit to stipulate the transmission times and/or of a (second) timer used in the central unit for the evaluation of the reception times.

This measure can advantageously be used to compensate for a difference, e.g. present due to tolerances, in the rate firstly of the timers (clocks) used in the wheel unit and secondly of the timers used in the central unit. This is important in particular when, during evaluation of the reception times, as mentioned, reception time windows are stipulated and these reception windows (or at least the time at which a reception window is opened) are intended to be placed relatively closely around or relatively close to the times that can be expected for a respective next data transmission.

In this regard, there may e.g. be provision for a correction value to be computed and stored in the central unit on the basis of a comparison of the intervals of time at which data transmissions arrive in the central unit and the intervals of time that have been ascertained for this purpose in the central unit (as a result of making allowance for the transmission algorithm) itself, which correction value allows a period stipulated by the wheel unit (e.g. interval of time from the next data transmission) to be converted into a period measured in the central unit (e.g. interval of time used for stipulating a reception window).

In terms of the stipulation of the reception time windows, there is provision according to one embodiment for reception and evaluation of a data transmission by the evaluation algorithm to be followed in the central unit, for example, initially only by stipulation that the preceding reception window is closed and a next reception window is opened shortly before the time that can be expected for the next data transmission. In this case, there may be provision for, if the expected data transmission is not received (for example at the expected time), the opened reception window to remain open until a new data transmission is actually received from the relevant wheel unit.

As a departure therefrom, the intention is not to preclude the respective reception window provided for the next data transmission from being stipulated completely, i.e. the beginning and end of this reception window, right at the time of reception of a data transmission. The width of this reception window may be e.g. at least 1%, in particular at least 2% and/or no more than 20%, in particular no more than 10%, of the period between reception of the data transmission and the expected time of reception of the next data transmission.

In one embodiment, there is provision for the rating of a respective received data transmission to comprise plausibilization as to whether data contained in this data transmission are to be supplied to a further use.

In the simplest case, each data transmission is rated either as "valid" (plausible) or as "invalid" (implausible), as already mentioned, and only the data transmissions rated as valid are supplied to a further use. However, the invention is also not intended to preclude a more detailed rating (i.e. having more than two possible rating results), on the basis of which a selection is then made among multiple possible further uses in order to supply the data transmission to the or the respectively selected use(s).

The reception times can be evaluated and/or the data transmissions can be rated in particular by means of the central unit. As a result, the number of components needed for performing the method can advantageously be kept low.

In a further embodiment, however, it is also additionally or alternatively possible for the reception times to be evaluated and/or the data transmissions to be rated by means of a unit, which is different than the central unit, that is coupled to the central unit via a data connection. As a result, the central unit can be relieved of the burden of the possibly computationally intensive evaluation or rating. The unit that is different than the central unit may in this case be part of the vehicle or be coupled to the vehicle via a data connection. By way of example, the unit that is different than the central unit may be a mobile terminal of a vehicle user, in particular a cell phone coupled to the vehicle via a data connection.

A further aspect of the invention relates to an apparatus for transmitting data from a wheel unit, arranged on a wheel of a vehicle, to a central unit of the vehicle, having:
 a wheel unit configured for arrangement on a wheel of a vehicle, having means for sending data in the form of temporally spaced data transmissions from the wheel unit to the central unit, transmission times of the data transmissions being stipulable by the wheel unit according to a transmission algorithm, and
 a central unit configured for arrangement on the vehicle, having means for receiving the data transmissions sent by the wheel unit.

The apparatus further has:
 means for evaluating reception times at which each of the data transmissions are received by the central unit, according to an evaluation algorithm making allowance for the transmission algorithm, and
 means for rating the data transmissions on the basis of a result of the evaluation of the reception times.

The embodiments and developments described above for the method according to the first aspect of the invention may also be provided in an analogous manner as embodiments and developments of the apparatus according to the further aspect of the invention, and vice versa.

In one embodiment, the central unit has the means for evaluating reception times and/or the means for rating the data transmissions. As a result, the number of components of the apparatus can advantageously be kept low.

In a further embodiment, the means for evaluating reception times and/or the means for rating the data transmissions are coupled to the central unit via a data connection. As a result, the central unit can be relieved of the burden of the possibly computationally intensive evaluation or rating. The means for evaluating reception times and/or the means for rating the data transmissions may in this case be part of the vehicle or be coupled to the vehicle via a data connection. By way of example, the means for evaluating reception times and/or the means for rating the data transmissions may be part of a mobile terminal of a vehicle user, in particular of a cell phone coupled to the vehicle via a data connection.

In terms of the configuration of the wheel unit, this may be provided e.g. for arrangement on an inside of a tread of a tire on the relevant wheel and may have e.g. (at least) a sensor device such as e.g. a pressure sensor (in the case of a tire pressure control system) and a transmission device (in particular a radio transmission device). Expediently, the e.g. battery-operated wheel unit further comprises a program-controlled computer device (e.g. a microcontroller) for processing the (at least one) sensor signal and for generating the data or data transmissions (e.g. digitally encoded data messages) to be transmitted. In particular, the wheel unit may also have an acceleration and/or shock sensor and/or further sensor devices (e.g. a temperature sensor), the sensor signals of which can likewise have allowance made for them by the cited computer device during the generation of the data to be transmitted.

In the case of a multi-wheeled vehicle, e.g. having three wheels or e.g. having four wheels (e.g. an automobile), a separate wheel unit of the type described here is preferably arranged on each of these wheels. The data transmissions sent by the individual wheel units preferably each contain an identification code identifying the wheel unit. The data transmissions coming from different wheel units are preferably received, evaluated and rated by a central unit, jointly used for this purpose, of the vehicle.

The data transmissions are preferably transmitted via a digital radio link between the (at least one) wheel unit and the central unit, for which purpose the wheel unit is equipped with an appropriate radio transmission device and the central unit is equipped with an appropriate radio reception device.

The central unit or the means for evaluating reception times and/or the means for rating the data transmissions are preferably configured as a program-controlled data processing device (e.g. microcontroller) or comprise such a data processing device, in order to evaluate the reception times of the received data transmissions and to take a result of this evaluation as a basis for rating the respective data transmissions.

Furthermore, the central unit is equipped with means for receiving the data transmissions, for example with a radio reception device suitable for this purpose.

According to a further aspect of the invention, a computer program product comprising a program code is provided that, when executed on a data processing device (e.g. the wheel unit and the central unit), performs a data transmission method of the type described here.

A further aspect of the invention relates to a computer-readable medium having such a computer program product.

The invention is described in more detail below on the basis of exemplary embodiments with reference to the enclosed drawings, in which:

FIG. 1 shows a vehicle 1, in this case a motor vehicle (e.g. an automobile) having four wheels W1 to W4.

Figure 1:
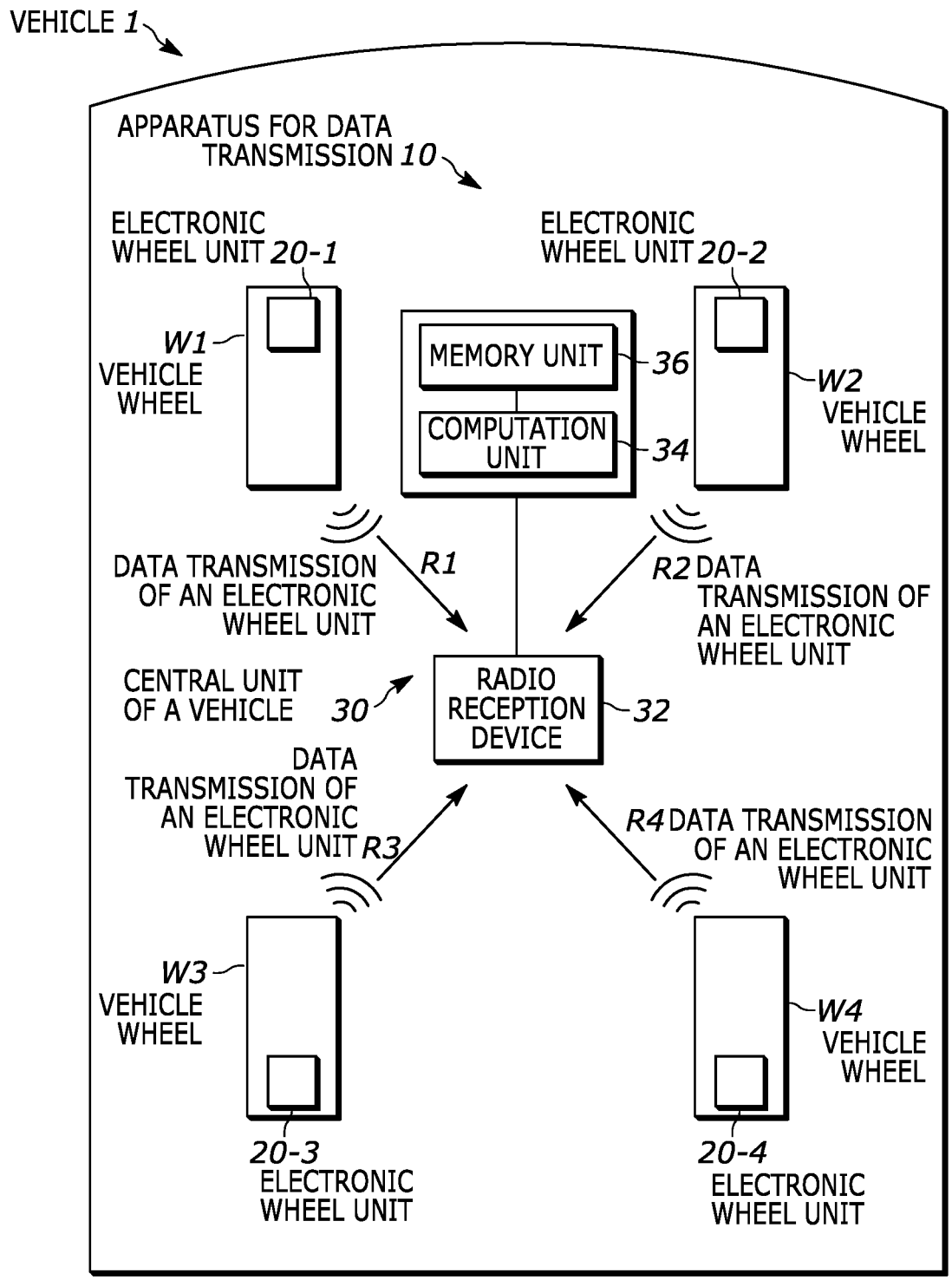
FIG. 1 shows a schematic plan view of a vehicle with an apparatus for data transmission according to an exemplary embodiment.

The wheels W1 to W4 are each equipped with a tire and what is known as an electronic wheel unit 20-1 to 20-4, e.g. arranged on an inside of the relevant tire tread, in order to capture at least one wheel operating parameter, such as in this case in particular at least the internal tire pressure, and to wirelessly (via a radio connection) send corresponding sensor data in the form of temporally spaced data transmissions R1 to R4 to a radio reception unit 32 that is vehicle-based, i.e. arranged in the vehicle 1.

The transmission times at which, by way of example, the data transmissions R1 are effected are in this case stipulated according to a transmission algorithm running in the wheel unit 20-1. A similar situation applies to the stipulation of the transmission times of the data transmissions R2, R3 and R4, which are stipulated by a transmission algorithm of the wheel units 20-2, 20-3 and 20-4 that operates identically in each case in the embodiment shown.

The data transmissions R1 to R4 received by the radio reception unit 32 are communicated e.g. via a digital data bus (e.g. CAN bus, LIN bus, etc.) to an evaluation and rating device, which is formed by a computation unit (microcontroller) 34 and an associated memory unit 36 in the example depicted.

The components 32, 34 and 36 therefore form a central unit 30 that is arranged in the vehicle 1 and, as described, receives the data transmissions R1, R2, R3 and R4 sent by each of the wheel units 20-1 to 20-4, so as then to evaluate, separately for each of the wheel units 20-1 to 20-4, the reception times at which the relevant data transmissions R1, R2, R3 and R4 are each received by the central unit 30 according to an evaluation algorithm running in the computation unit 34, and finally to rate said reception times on the basis of a result of this evaluation. Program code used for this purpose is stored in the memory unit 36.

The computation unit 34 and the memory unit 36 in the embodiment shown therefore form means for evaluating reception times at which the data transmissions R1, R2, R3 and R4 are each received by the central unit 30 according to an evaluation algorithm making allowance for the transmission algorithm. Further, the computation unit 34 and the memory unit 36 in the embodiment shown form means for rating the data transmissions R1, R2, R3 and R4 on the basis of a result of the evaluation of the reception times.

In the embodiment shown, the central unit 30 therefore has the means for evaluating reception times and the means for rating the data transmissions R1, R2, R3 and R4.

In a further embodiment, the means for evaluating reception times and/or the means for rating the data transmissions R1, R2, R3 and R4 are coupled to the central unit 30 via a data connection. The means for evaluating reception times and/or the means for rating the data transmissions may in this case be part of the vehicle 1 or be coupled to the vehicle 1 via a data connection. By way of example, the means for evaluating reception times and/or the means for rating the data transmissions may be part of a mobile terminal (not shown) of a vehicle user, in particular of a cell phone (not shown) coupled to the vehicle 1 via a data connection.

The components 20-1 to 20-4 and the central unit 30 in the embodiment shown form an apparatus 10 for transmitting data from the wheel units 20-1 to 20-4 arranged on the wheels W1 to W4 of the vehicle 1 to the central unit 30 of the vehicle 1.

The evaluation performed by the central unit 30 in this example comprises stipulating reception time windows for the reception times and comparing the actual reception times with the reception time windows, i.e. evaluation of whether a relevant reception time is inside or outside the relevant reception window.

On the basis of the applicable result of this evaluation, each received data transmission is rated by the computation unit 34 as valid or as invalid.

The stipulation of the reception time windows that is performed by the central unit 30 in the embodiment shown involves the evaluation algorithm making allowance for the transmission algorithm running in the individual wheel units 20-1 to 20-4.

By way of example, reception of a data transmission rated as valid from a particular one of the wheel units 20-1 to 20-4 is followed by the stipulation of a subsequent period within which the reception of a next data transmission from the same wheel unit appears implausible. In other words, a closed reception window for the relevant wheel unit is stipulated for this period.

To ascertain such a period, the central unit 30 can resort e.g. to the result of the evaluation of preceding reception times and, given knowledge of the transmission algorithm, draw an appropriate conclusion as to the next time that can be expected for a data transmission from the same wheel unit.

Alternatively or additionally, information about a current mode of operation and/or about the interval of time between successive data transmissions that is contained in the preceding data transmissions of the relevant wheel unit itself can possibly also be used.

The transmission algorithm running in each of the wheel units 20-1 to 20-4 in the example depicted provides for an idle mode (when the vehicle is switched off, e.g. parked) and a normal mode of operation (while the vehicle is traveling), the transmission algorithm stipulating (at least approximately) the interval of time between successive data transmissions on the basis of the current mode of operation.

Figure 2:
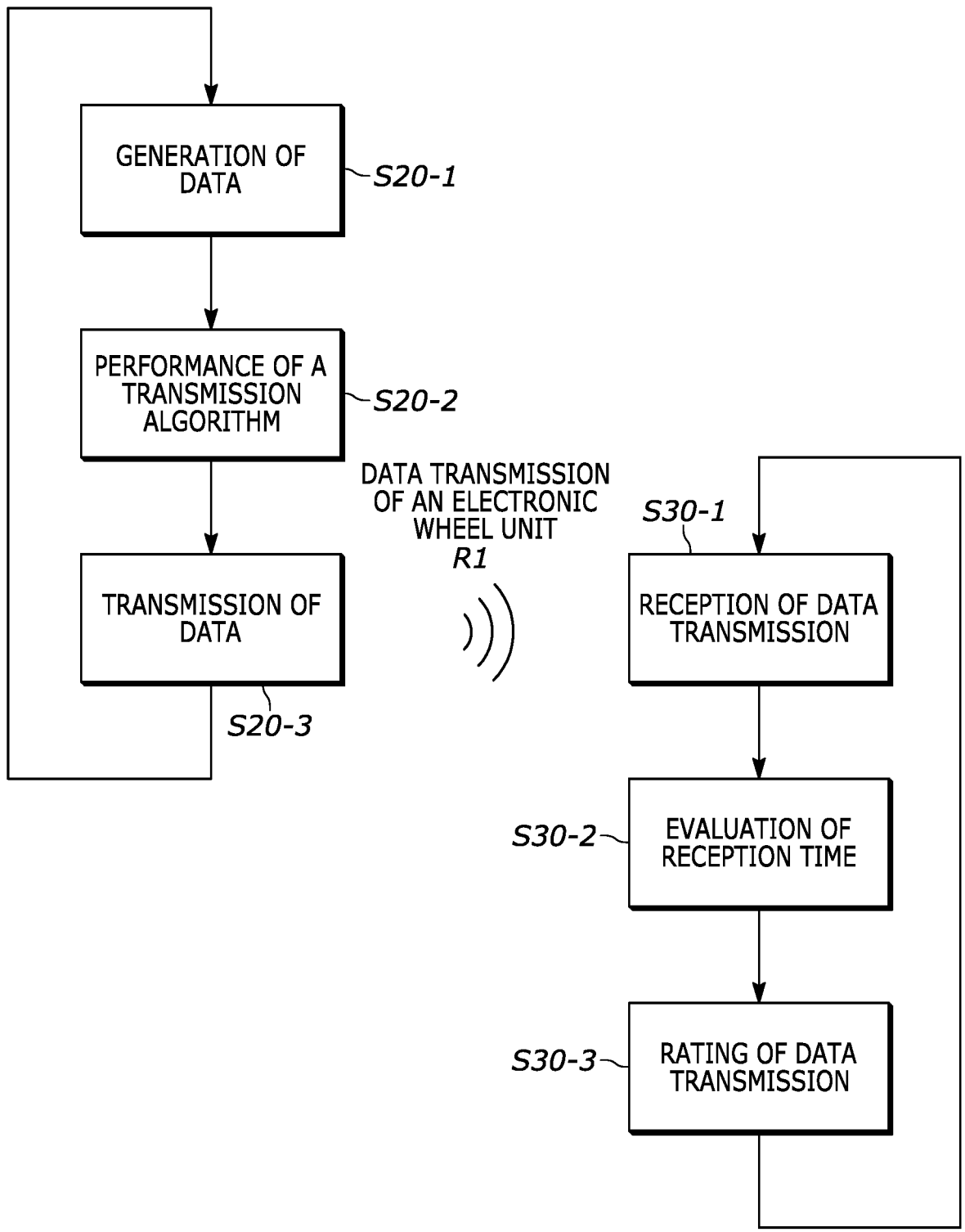
FIG. 2 shows a flowchart for a method for data transmission according to an exemplary embodiment.

FIG. 2 illustrates essential steps of the data transmission method performed by means of the data transmission apparatus 10. The left-hand part of FIG. 2 depicts steps performed by one of the wheel units 20-1 to 20-4, whereas the right-hand part of FIG. 2 depicts steps performed by the central unit 30 in the embodiment shown.

The relevant wheel unit generates data to be transmitted in a step S20-1 by virtue of sensor signals of one or more sensors of this wheel unit being processed under program control and the processing results being digitally encoded.

A step S20-2 symbolizes the performance of the transmission algorithm by the wheel unit, which involves the transmission times of the individual data transmissions of this wheel unit being stipulated.

In the example depicted, an interval of time between successive instances of these data transmissions is stipulated on the basis of a current mode of operation of the wheel unit. This stipulation can be e.g. augmented or refined further by virtue of allowance being made for the fact that each of the individual data transmissions should be transmitted at particular preferred rotary angle positions of the relevant wheel. Fine adjustment of this kind is a partial functionality of the transmission algorithm in this case. The data transmissions can in this case also each contain a piece of information relating to the aforementioned fine adjustment.

In a step S20-3, a data transmission whose content and transmission time have previously been determined by steps S20-1 and S20-2 is finally transmitted.

As depicted, steps S20-1 to S20-3 are repeated for as long as the wheel unit is in operation. The same kind of steps are performed in an appropriate manner in the further wheel units that may be present.

The central unit 30 of the vehicle 1 receives a data transmission in a step S30-1. FIG. 2 depicts the reception of a data transmission R1, that is to say coming from the wheel unit 20-1, by way of example.

In a step S30-2, the reception time of this data transmission and one or more reception times of immediately past received data transmissions are evaluated by an evaluation algorithm running in the central unit 30 in the embodiment shown.

In a step S30-3, the currently received data transmission is finally rated on the basis of the result of the preceding evaluation in step S30-2.

In the example depicted, the rating comprises plausibilization as to whether data contained in this data transmission (or which data contained in this data transmission) are to be supplied to a further (or to which further) use.

Figure 3:
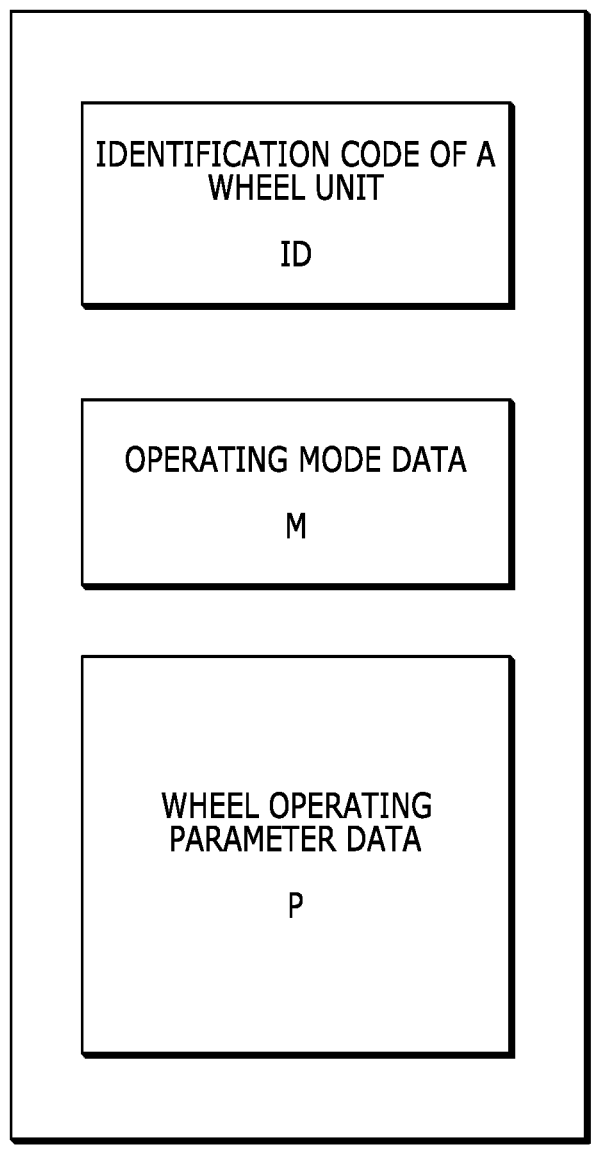
FIG. 3 shows an exemplary depiction of the data that a data transmission contains.

FIG. 3 shows, by way of example, a data transmission R1 that contains an identification code ID for explicit identification of the relevant wheel unit (in this case: 20-1), operating mode data M (representative of a current mode of operation of the wheel unit) and wheel operating parameter data P (representative of the actual useful data of the wheel unit, such as e.g. data about the current internal tire pressure, internal tire temperature, tire contact area length, etc.).

Figure 4:
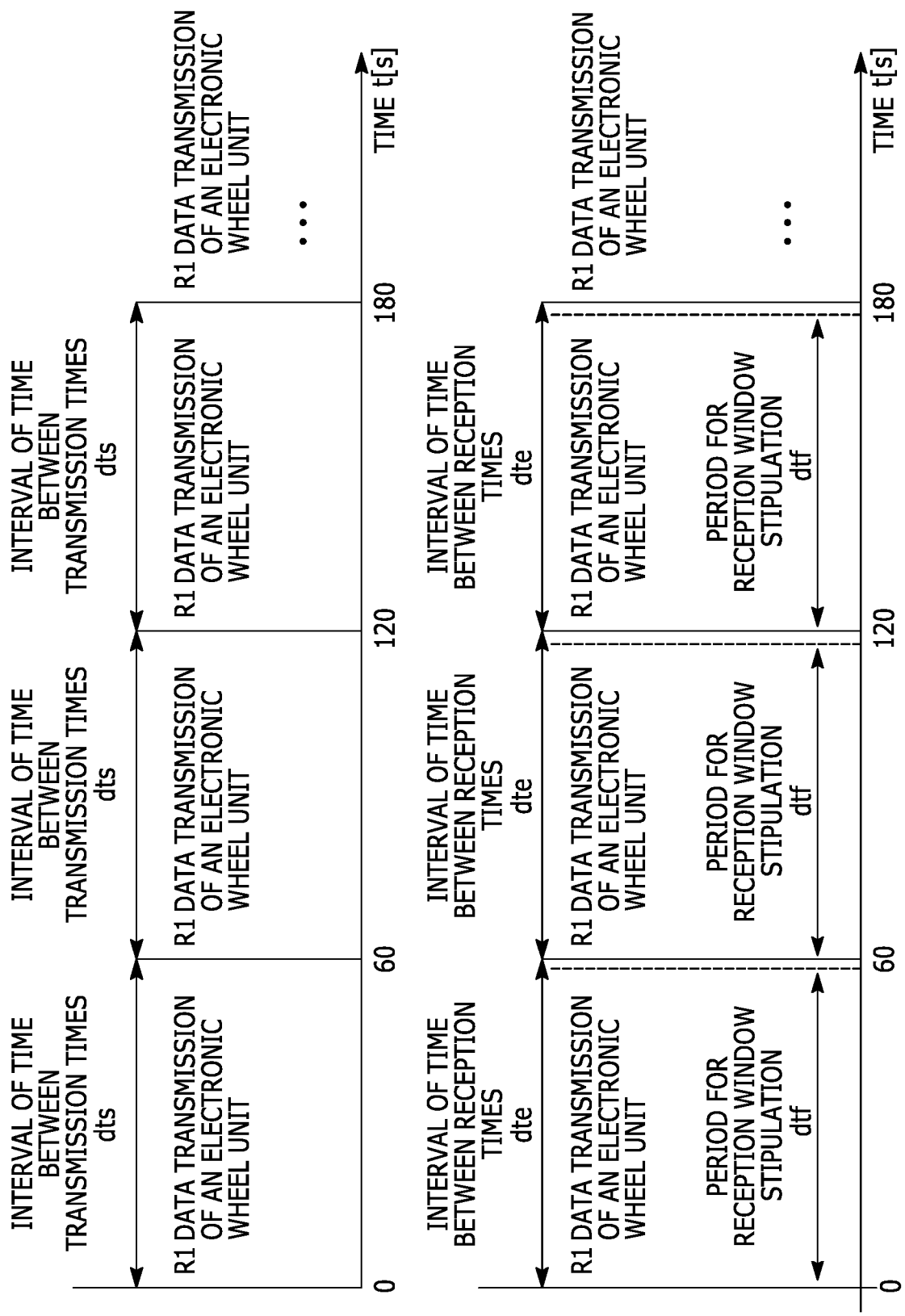
FIG. 4 shows an exemplary depiction of a timing sequence for data transmissions.

FIG. 4 illustrates a timing sequence for data transmissions R1 by way of example.

The upper part of FIG. 4 depicts, e.g. for a current normal mode of operation, (essentially) temporally equidistant transmission of data transmissions R1 sent at an interval of time dts (in this case: dts=60 s) stipulated by the transmission algorithm.

The lower part of FIG. 4 depicts reception of the data transmissions R1 for this example, said data transmissions accordingly being received by the central unit 30 at a reciprocal interval of time dte (dte=dts). After respective reception of a data transmission R1, the central unit 30 stipulates a period dtf (in this case: dtf=94%×dte). Should a data transmission from the relevant wheel unit be received during this period dtf, this data transmission is fundamentally rated as not valid, unless the content of this data transmission reveals that the relevant wheel unit has changed to an alarm mode of operation, and that the reception time established is compatible with the provisions of the transmission algorithm for the alarm mode of operation.

Even if, in the example depicted, after the period dtf has elapsed, the reception time window used for the rating remains open until a subsequent data transmission R1 is actually received, a further period (not depicted in FIG. 4) in addition to the period dtf can also be stipulated by which a respective next data transmission R1 should be received (e.g. 104%×dte). This allows rating of the next data transmission R1 on the basis of the circumstance of whether this next data transmission R1 has been received by the end of the stipulated period (or late).

LIST OF REFERENCE SIGNS

1 Vehicle
W1-W4 Vehicle wheels
10 Apparatus for data transmission
20-1-20-4 Electronic wheel units
R1-R4 Data transmissions of the electronic wheel units
30 Central unit of the vehicle
32 Radio reception device
34 Computation unit
36 Memory unit
S20-1 Generation of data
S20-2 Performance of a transmission algorithm
S20-3 Transmission of data transmissions
S30-1 Reception of data transmissions
S30-2 Evaluation of reception times
S30-3 Rating of data transmissions
ID Identification code of the wheel unit
M Operating mode data
P Wheel operating parameter data
t Time
dts Interval of time between transmission times
dte Interval of time between reception times
dtf Period for reception window stipulation

The invention claimed is:

1. A method for transmitting data from a wheel unit, arranged on a wheel of a vehicle, to a central unit of the vehicle, the method comprising:
   sending the data as temporally spaced data transmissions from the wheel unit to the central unit, transmission times of the data transmissions being stipulated by the wheel unit according to a transmission algorithm,
   receiving the data transmissions sent by the wheel unit at the central unit,
   evaluating reception times at which each of the data transmissions are received by the central unit, according to an evaluation algorithm making allowance for the transmission algorithm,
   rating the data transmissions based on a result of the evaluation of the reception times, wherein each data transmission from a respective wheel unit is rated as invalid if it is received within less than 20% of the interval of time expected for a next data transmission from the respective wheel unit after reception of a valid data transmission from the respective wheel unit.

2. The method as claimed in claim 1, wherein the wheel unit is switchable between multiple modes of operation and the transmission algorithm involves an interval of time between successive instances of the data transmissions being stipulated based on a current mode of operation of the wheel unit.

3. The method as claimed in claim 2, wherein each of the data transmissions contains a piece of information about at least one of the current mode of operation of the wheel unit and a piece of information about the interval of time between successive instances of the data transmissions.

4. The method as claimed in claim 2, wherein the wheel unit has an alarm mode of operation and wherein a data transmission transmitted in the alarm mode of operation is rated as valid if the reception time of the data transmission is within a period that the transmission algorithm approves for transmitting in the alarm mode of operation.

5. The method as claimed in claim 1, wherein the data transmissions of the wheel unit are received using a signal reception device of the central unit, the signal reception device further configured to receive data transmissions of at least one further transmission device, which is different than the wheel unit.

6. The method as claimed in claim 1, wherein the evaluating of the reception times comprises adapting rates at least one of a timer used in the wheel unit to stipulate the transmission times and of a timer used in the central unit for the evaluation of the reception times.

7. The method as claimed in claim 1, wherein the rating of a respective received data transmission comprises plausibilization as to whether data contained in this data transmission are to be supplied to a further use.

8. The method as claimed in claim 1, wherein at least one of the reception times are evaluated and the data transmissions are rated at the central unit.

9. The method as claimed in claim 1, wherein at least one of the reception times are evaluated and the data transmissions are rated at a unit, the unit being different than the central unit, the unit being coupled to the central unit via a data connection.

10. A non-transitory computer-readable medium having a program code that, when executed on a data processing device, performs the method as claimed in claim 1.

11. The method as claimed in claim 1, wherein the evaluating of the reception times comprises stipulating reception time windows for the reception times and comparing the actual reception times with the reception time windows.

12. The method as claimed in claim 11, wherein data transmissions received outside a reception window are rated as invalid.

13. The method as claimed in claim 1, wherein the rating of the data transmissions comprises rating the received data transmissions as valid or invalid based on the evaluation of the reception times.

14. The method as claimed in claim 13, wherein the central unit provides a rating result that is used to eliminate invalid data transmissions before further use of data content of the data transmissions.

15. The method as claimed in claim 3, wherein the wheel unit has an alarm mode of operation and wherein a data transmission transmitted in the alarm mode of operation is rated as valid if the reception time of the data transmission is within a period that the transmission algorithm approves for transmitting in the alarm mode of operation.

16. The method as claimed in claim 1 wherein the transmission algorithm is capable of making an allowance for a physical variable capturable at a relevant wheel, and the transmission algorithm is not a random algorithm and the physical variable varies consistently with operation of the wheel.

17. An apparatus for transmitting data from a wheel unit, arranged on a wheel of a vehicle, to a central unit of the vehicle, involving:
- a wheel unit configured for arrangement on a wheel of a vehicle, and further configured to send data as temporally spaced data transmissions from the wheel unit to the central unit, transmission times of the data transmissions being stipulable by the wheel unit according to a transmission algorithm,
- a central unit configured for arrangement on the vehicle, comprising a receiver for receiving the data transmissions sent by the wheel unit,
- a unit configured to evaluate reception times at which each of the data transmissions are received by the central unit, according to an evaluation algorithm making allowance for the transmission algorithm,
- a unit configured to rate the data transmissions based on a result of the evaluation of the reception times, wherein each data transmission from a respective wheel unit is rated as invalid if it is received within less than 20% of the interval of time expected for a next data transmission from the respective wheel unit after reception of a valid data transmission from the respective wheel unit.

18. The apparatus as claimed in claim 17, wherein the central unit comprises at least one of the unit configured to evaluate reception times and the unit configured to rate the data transmissions.

19. The apparatus as claimed in claim 17, wherein at least one of the unit configured to evaluate reception times and the unit configured to rate the data transmissions is coupled to the central unit via a data connection.

20. The apparatus as claimed in claim 17 wherein the transmission algorithm is capable of making an allowance for a physical variable capturable at a relevant wheel, and the transmission algorithm is not a random algorithm and the physical variable varies consistently with operation of the wheel.

* * * * *